(12) United States Patent
Petack et al.

(10) Patent No.: US 6,264,022 B1
(45) Date of Patent: Jul. 24, 2001

(54) COVER BELT CONVEYOR FOR CONVEYING BULK MATERIAL

(75) Inventors: Burkhard Petack, Senftenberg; Horst Jurisch, Grünewalde; Dirk Slowik, Muckwar, all of (DE)

(73) Assignee: MAN TAKRAF Fördertechnik GmbH (DE)

( * ) Notice: Subject to any disclaimer, the term of this patent is extended or adjusted under 35 U.S.C. 154(b) by 0 days.

(21) Appl. No.: 09/483,012

(22) Filed: Jan. 13, 2000

(30) Foreign Application Priority Data

Jan. 15, 1999 (DE) ............................................... 199 01 287

(51) Int. Cl.[7] .................................................... B65G 15/14
(52) U.S. Cl. ............................................................ 198/626.4
(58) Field of Search .............................. 198/626.4, 626.6

(56) References Cited

U.S. PATENT DOCUMENTS

| | | | | |
|---|---|---|---|---|
| 1,345,454 | * | 7/1920 | Mascart | 198/626.4 |
| 2,966,254 | * | 12/1960 | Kaiser | 198/626.4 |
| 4,561,537 | * | 12/1985 | Dos Santos | 198/626.4 |
| 4,565,281 | * | 1/1986 | Kramer | 198/626.4 |
| 4,566,586 | * | 1/1986 | Robertson | 198/626.4 |
| 4,609,097 | * | 9/1986 | Dos Santos | 198/626.4 |

FOREIGN PATENT DOCUMENTS

| | | | | |
|---|---|---|---|---|
| 259022 | * | 4/1970 | (RU) | 198/626.4 |
| 368138 | * | 1/1973 | (RU) | 198/626.4 |

* cited by examiner

*Primary Examiner*—Joseph E. Valenza
(74) *Attorney, Agent, or Firm*—McGlew and Tuttle, P.C.

(57) ABSTRACT

A cover belt conveyor with a basic belt guided by three support rollers (9) arranged in a trough-shaped pattern. To guarantee the ability of such a cover belt conveyor to function at different amounts of material to be conveyed, four pressure rollers (11) are arranged over the entire width of the cover belt (3) in the case of a basic belt (2) with a troughed support roller station comprising three support rollers (9) such that the two middle pressure rollers (11a) always act on the area opposite the middle roller (9) and the two outer pressure rollers (11b) of the cover belt (3) act on the area opposite the two oblique support rollers (9). The pressure rollers (11) are arranged individually pivotably on the frame of the conveyor and they can thus automatically adapt themselves to the particular volume of material to be conveyed between zero and a maximum and apply the necessary pressure on the cover belt (3) in the process. Two inner and two outer pressure rollers (11a and 11b) are always arranged alternatingly in the direction of conveying.

14 Claims, 4 Drawing Sheets

COVER BELT CONVEYOR FOR CONVEYING BULK MATERIAL

FIELD OF THE INVENTION

The present invention pertains to a cover belt conveyor especially on sloping or vertical conveyor belts and more particularly to a cover belt arrangement with a trough shaped basic belt and a cover belt, of which either both the basic belt and the cover belt are driven or only the basic belt is driven and the cover belt is carried by a frictional connection, wherein pressure rollers are provided for a nonpositive conveying of bulk material, especially in a steep or vertical direction of conveying.

BACKGROUND OF THE INVENTION

Conveyors of this type are used where the slope of the conveying path upward or downward is so steep that the bulk material is no longer carried satisfactorily as a consequence of its properties and the excessively weak friction with the conveyor belt and it would slide downward. The practical possibilities of application include slope conveyors or elevators for loading silos, elevators for continuously operating ship unloaders and steep belt conveyors leading out of strip mining operations.

Cover belt conveyors comprise, in general, a horizontal or only slightly sloping section for picking up the material to be conveyed and a steep or vertical conveying section having a height difference for transporting the material to be conveyed. The material delivery may be located at the end of this steep or vertical conveying section or of a downstream horizontal or only slightly sloping section. The transitions between conveying sections of different slopes are made arc-shaped. Such a conveyor comprises, in general, a support frame, a basic belt and a cover belt as well as carrying and pressure rollers. The basic belt extends over the entire length of the conveying path, while the cover belt is needed only in the steep or vertically extending conveying sections, where the material being conveyed is to be pressed by the cover belt onto the basic belt and is to be carried by frictional connection. The bulk material compressed between the two belts forms a continuous conveying strand. Both the basic belt and the cover belt are driven or only the cover belt is driven, the cover belt being carried by frictional engagement in the latter case.

Due to the differences in the amount of material available for conveying, the conveying cross section must be able to be changed from zero to a maximum and the pressing pressure required in the particular case must always be present. A lower pressing pressure is sufficient in the case of an empty conveying strand as compared to that of a loaded one.

To overcome the height difference from the floor of the strip mine to the upper edge of the strip mine, a cover belt conveyor, in which the cover belt is pressed by rubber wheels against the basic belt, has been known from Durst/Vogt, *Schaufelradbagger*, pp. 111 and 112, 1986, Trans Tech Publications, Clausthal-Zellerfeld. Each of these wheels is articulated to the belt frame by a lever. These levers are directed obliquely against the cover belt in the conveying direction. The necessary pressing force is generated by springs. One set of these wheels is arranged in a row, so that the cover belt is pressed against the basic belt over its entire width. The drawback of this solution is that the wheels act on the cover belt in a narrow area only as a consequence of their circular tire cross section and the cover belt, which is flexible, in principle, and fits the surface of the material being conveyed, must therefore have a certain minimum transverse rigidity to distribute the pressing forces acting on the material being conveyed over the entire width of the flow of material being conveyed. Since it is impossible to meet both requirements on the bending strength of the cover belt at the same time, a compromise must be found in a mean value.

A cover belt conveyor, in which the cover belt is pressed onto the basic belt in one plane each by two rollers and a coil spring arranged between the rollers, has been known from DE-AS 15 56 581. The rollers are mounted on axle journals fastened pivotably to the frame of the conveyor and thus they press the edge areas. A reliable closing is thus guaranteed in the edge areas due to the special local introduction of forces and no material being conveyed can escape. The coil spring arranged in between, which rotates together with the outer rollers, has a somewhat smaller diameter than the two outer rollers and thus it preferably presses the middle area, which has a larger conveying cross section in the state of conveying. The characteristic of the coil spring may be selected to be such that the strongest pressing pressure is also reached at a large filling cross section.

The steep belt conveyor forming this class, in which this effect is achieved by pressing devices that are directed against the cover belt, has been known from DE 34 29 940 C2. These pressing devices comprise rotating arm supports, which are pivotably arranged on the frame of the conveyor and carry articulated pressure rollers at their free end. Torsion springs are provided to generate the necessary pressing pressure.

With a steep belt conveyor thus equipped, the cover belt can be pressed in the direction of the troughed basic belt with the volume of the material to be conveyed ranging from zero to the maximum and sufficient pressing can thus be applied to the material being conveyed. The pressure rollers can be adapted, in principle, to the filling cross section and the geometry and the material flow cross section due to the lever mechanism and the articulated mounting of the four loading rollers distributed over the entire width of the belt in the compensating brackets arranged as rocker systems. However, hollow spaces may be formed in the two outer areas of the troughed basic belt, because the pressure rollers press the cover belt onto the basic belt with their outer edges and the conveying cross section thus becomes smaller from the inside to the outside in a wedge-shaped pattern. The greatest wear between the pressure rollers and the cover belt also develops at these outer edges due to the local concentration of forces. The lever lengths of the rocker system are symmetrical, so that the force that is transmitted by the torsion spring to the support rollers arranged on both sides is distributed uniformly over the entire width of the belt. However, this is linked with the drawback that the pressure on the cover belt is the same over the entire width of the belt. However, a higher pressure is, in fact, needed in the middle area of the cross section of the bulk material as a consequence of the larger amount of material to be conveyed than in the two edge areas where a smaller amount of material is to be conveyed.

Another cover belt conveyor, in which the spring-loaded levers of the rocker systems with the pressure rollers are arranged on the belt frame above the cover belt on both sides relative to the belt width, has been known from DE 196 41 161 C2 (corresponding to U.S. Pat. No. 524,053; U.S. Pat. No. 524,056; U.S. Pat. No. 524,057; U.S. Pat. No. 524,058; U.S. Pat. No. 524,059; and U.S. Pat. No. 524,060). The longitudinal axes of the joints of the rocker systems extend in parallel to the direction of conveying. The lever lengths of the rockers carrying the pressure rollers are selected to be such that a stronger pressure is applied in the area in which the amount of material being conveyed is larger than in the areas in which the amount of material being conveyed is smaller. Due to the levers of the rocker systems being arranged on the belt frame at right angles to the direction of conveying, a transverse friction effect is generated due to the rolling resistance of the pressure rollers as a consequence of the yield of these levers due to the change in the axes of rotation of the pressure rollers in relation to the direction of conveying, as a result of which the entire dynamic behavior of the pressing behavior is adversely affected. An additional transverse friction effect is generated in this solution, as in the above-mentioned solution according to DE 34 29 940 C2, due to the fact that the distance between the cover belt and the mount of the pressing levers changes at different degrees of filling and a certain straight line on the circumference of a pressure roller performs a relative movement on the surface of the cover belt, whose direction is at right angles to the direction of conveying.

Furthermore, DE 41 38 226 C2 discloses a cover belt conveyor, in which the basic belt and/or the cover belt is/are provided with beads. The material to be conveyed can be received in a cross section thus shaped. The basic belt and the cover belt are pressed against one another by spring-loaded rollers. The beads are hollow and thus they can easily adapt themselves to the different amounts of material to be conveyed. An upper and lower support roller each, which are short and are mounted on one side, are arranged for guidance opposite each other in pairs at the bead-free outer edges on the return strand of the belt provided with beads. The cost of these conveyor belts provided with beads is considerably higher than that of simple, flat conveyor belts.

SUMMARY AND OBJECTS OF THE INVENTION

The primary object of the present invention is to design a cover belt conveyor in the manner described in the introduction such that reliable carrying of the material to be conveyed is guaranteed in the steep and vertical conveying area with simple means at different degrees of filling. The pressure rollers are arranged, relative to the cross section of the material being conveyed, in the areas in which most of the material to be conveyed is present; the length of the pressure rollers does not exceed an area of the cover belt that has a height difference that cannot be compensated; the pressure rollers shall roll almost always on the same line on the cover belt in the direction of conveying, and the pressure rollers arranged next to one another shall not mutually hinder or affect one another.

According to the invention, a cover belt conveyor is provided for conveying bulk material. The conveyor includes a trough shaped basic belt and a cover belt, of which either both the basic belt and the cover belt are driven or only the basic belt Is driven and cover belt is carried by frictional connection. Pressure rollers are provided for the nonpositive carrying of the bulk material. These pressure rollers are arranged individually in the area of the sloping or vertical conveying section in a pivot axis on a frame by means of a lever. The lever is directed in the direction of conveying in one plane and obliquely against the cover belt by means of a spring in the other plane. A clamp or bracket, which receives the pressure roller on both sides in its axis, is provided as the connection between the pressure roller and the lever. The connection between the lever and the clamp is a joint, through which the pressure roller with its axis of rotation adapts itself automatically to the surface of the bulk material. The pressure rollers are always arranged between the support rollers of a trough station in the direction of conveying, so that the material being conveyed is carried in all sections of the conveying path. The inner and two outer pressure rollers are always arranged alternatingly one after the other in the direction of conveying individually on the the frame, pivotably by the lever. The two outer pressure rollers are always arranged on the support frame individually above the two bevels in the direction of pressing, relative to the cross-sectional area of the flow of material being conveyed, and the two inner pressure rollers are always arranged above the straight, nontroughed area of the basic belt in the pressing direction. The pressing force of the springs for the middle pressure rollers is selected to be stronger because of the larger amount of material being conveyed there than the pressing force of the springs of the two outer pressure rollers.

In the case of a cover belt with a support roller station comprising three support rollers, four pressure rollers are arranged opposite them over the entire width of the cover belt. In the direction of conveying, two pressure rollers are always arranged next to one another alternatingly between these support roller stations in the middle, straight area of the basic belt, and two pressure rollers are arranged in the oblique, troughed area of the basic belt. Each of the pressure rollers is mounted separately pivotably on a spring-loaded lever. These pressure rollers are thus prevented from mutually affecting one another. The length of one pressure roller is shorter than the length of half the middle roller of the basic belt. As a result, the pressure rollers can thus readily adapt themselves to the particular surface of the filling cross section occupied by the material being conveyed. The edges oft he pressure rollers are rounded off to rule out excessive stress on the cover belt in the edge areas of the pressure rollers.

In a cover belt conveyor, the two middle pressure rollers act on the cover belt in the area of the middle roller of the basic belt and thus form a common axis. The two outer pressure rollers act on the cover belt immediately after the transition to the trough oft he basic belt in the area of the two oblique support rollers of the basic belt. When the cover belt conveyor is filled with material to be conveyed, the pressure rollers adapt themselves to the cross section of the material being conveyed because of their short length. Extremely short elevations of the surface of the material being conveyed can be distributed by the pressure rollers. Even though no pressure rollers act at the lateral edge of the conveying members, the cross section of the material being conveyed between the basic belt and the cover belt is enclosed with certainty, because the cover belt comes automatically into contact with the basic belt as a consequence of its bending strength.

Due to the alternating arrangement of two inner and two outer pressure rollers in pairs, a force is generated on the material being conveyed, whose width is greater than the length of the pressure rollers, as a consequence of the bending strength of the cover belt and the pressure surface distribution as a consequence of the properties of the material being conveyed. At the same time, it is possible to position the pressure rollers, arranged offset in pairs in relation to one another, at closely spaced locations from one another at right angles to the direction of conveying, because they cannot mutually touch one another due to this offset arrangement. The most extreme position of an outer pressure roller in relation to the adjacent middle roller is reached when there is no material being conveyed between the basic belt and the cover belt. The axes of the outer and middle pressure rollers now form the same angle with one another as the axes of the two outer support rollers with the middle support roller of one garland for the basic belt.

The distances between the support roller stations for the basic belt and the pressure rollers for the cover belt are optimized for specific conditions of use. The concave and convex transitions present in the case of a change in the slope of the direction of conveying are designed according to the already known principles regardless of the solution according to the present invention. The design is simplified by the fact that the belt running on the outer radius is always pressed against the belt running on the inner radius.

High reliability of operation is guaranteed with a simple design of the pressing device.

The present invention may be used for conveyor belt installations intended for various fields of application and use as well as for materials with various properties.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
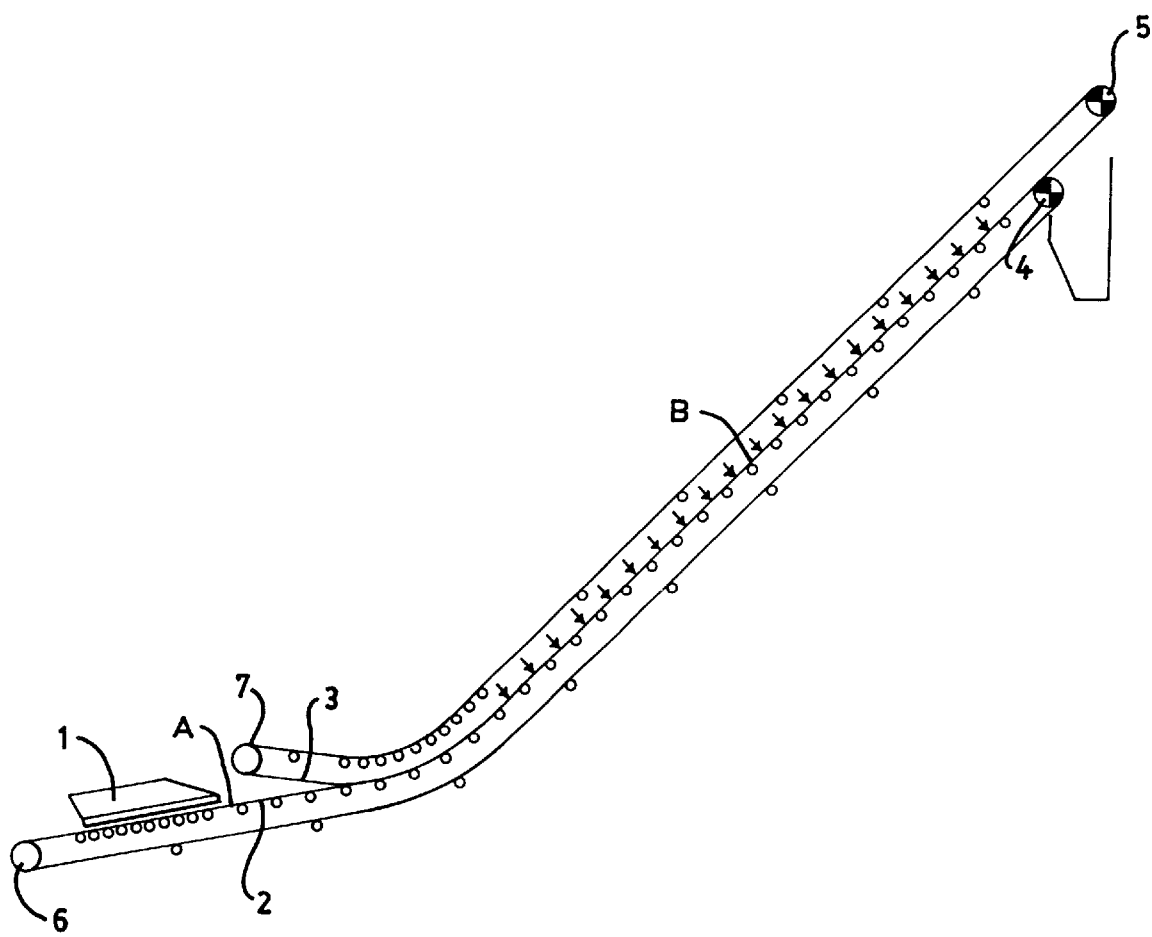
FIG. 1 is a schematic side view of a cover belt conveyor without its support frame.

Referring to the drawings in particular, the cover belt conveyor shown in FIG. 1 is intended for conveying bulk material, wherein the conveying path leads upward so steeply that the bulk material would no longer be carried satisfactorily by a simple belt conveyor of the prior-art design. It comprises an only slightly sloping section A with a chute 1 for picking up the bulk material and a conveying section B, which leads more steeply upward at an angle of about 45° to the horizontal, and at the end of which the bulk material is discharged by the cover belt conveyor. The transition between the two conveying sections is designed as a concavely curved radius. Such a cover belt conveyor may be used, e.g., to convey mineral raw materials from a strip mine with a steep slope.

Figure 2B:
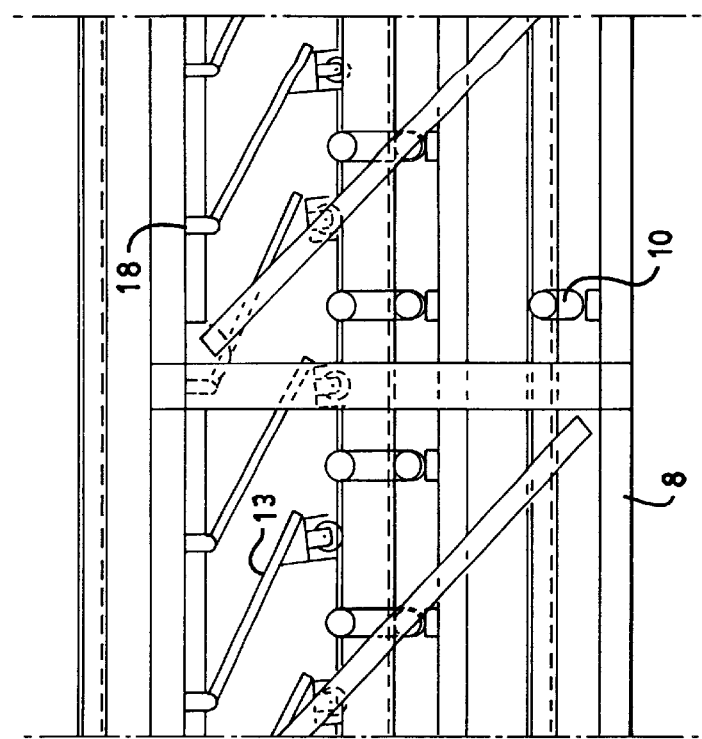
FIG. 2b is a side view of a section of the cover belt conveyor, in which the levers of the pressure rollers are pressed by a torsion spring at the articulation point on the frame in the direction of the basic belt.
Figure 2A:
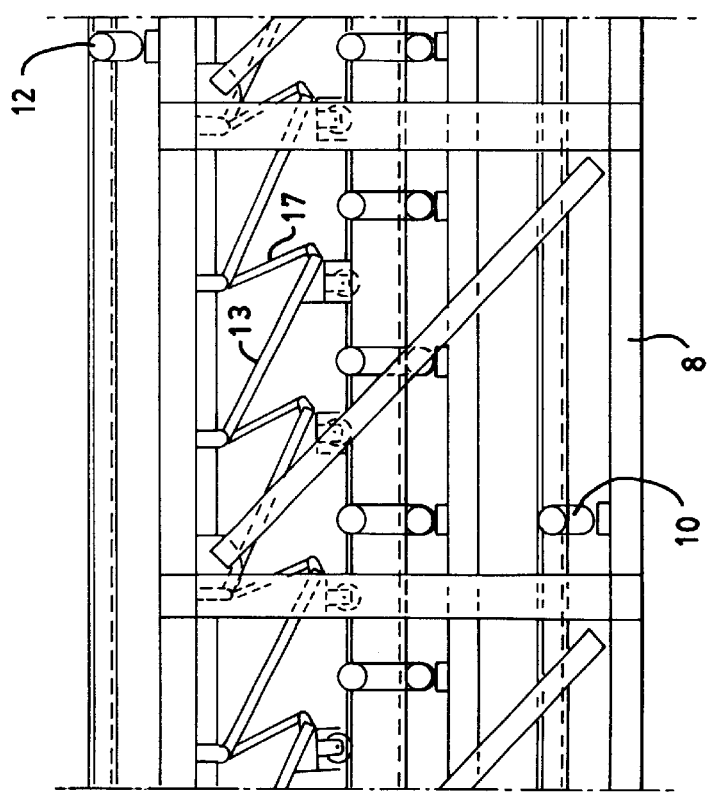
FIG. 2a is a side view of a section of the cover belt conveyor, in which the levers of the pressure rollers are pressed by a compression spring at the free end of the levers in the direction of the basic belt.

The conveying members of the cover belt conveyor are the basic belt 2, which extends over the entire conveying path, and the cover belt 3 arranged in the steep conveying section. The two drive drums 4 and 5 for the basic belt 2 and the cover belt 3 are arranged at the upper end and their two deflecting drums 6 and 7 are arranged at the lower end. The belt drives are designed such that the basic belt 2 and the cover belt 3 move at the same velocity. The drum 5 may also be a simple deflecting drum wherein only the basic belt is driven and the cover belt 3 is carried by frictional connection with the basic belt 2. The rollers for guiding the basic belt 2 and the cover belt 3 are arranged in the frame 8 as shown in FIGS. 2a and 2b. Three support rollers 9 (see FIG. 3) are provided for the basic belt 2 over the entire width in the load strand in a troughed (trough shaped) arrangement as support roller stations and two support rollers 10 are provided in a V-shaped arrangement in relation to one another in the return strand. The distances between them depend on the course of the belt, the stress and the intended effect during the carrying of the material to be conveyed in the steep conveying area. Two pressure rollers 11 (a and b) are always provided for the cover belt 3 in the load strand in an arrangement to be described in greater detail below, whereas two support rollers 12 arranged in pairs in a V-shaped arrangement in relation to one another are always used in the return strand, equivalently to the basic belt 2. The pressure rollers 11 (a and b) consist of individual rubber disks. The two outer rubber disks are rounded off on the outside.

Figure 5:
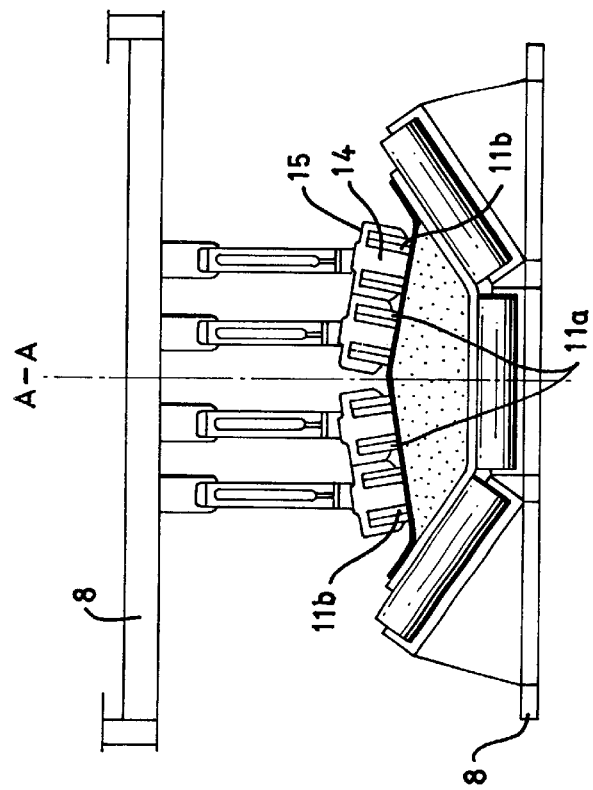
FIG. 5 is a cross-sectional view according to FIG. 4 in the loaded state of the cover belt conveyor.
Figure 4:
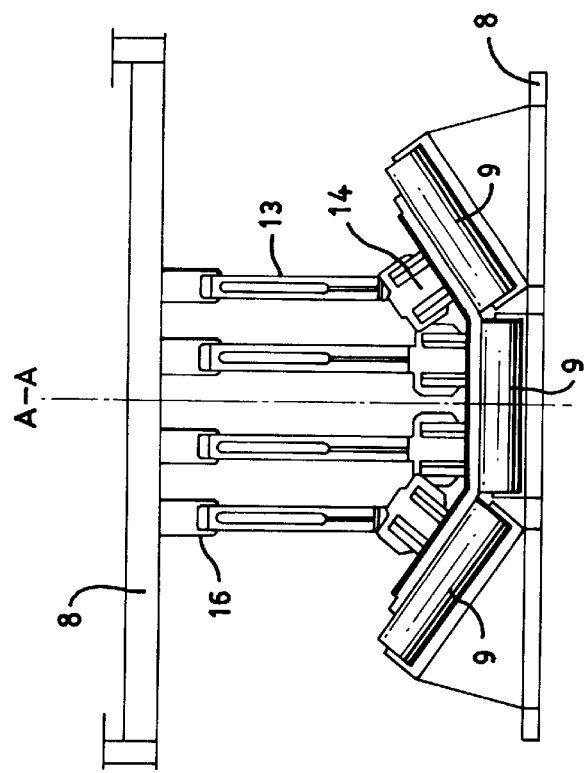
FIG. 4 is a cross-sectional view of the design of the cover belt conveyor according to Section A—A in FIG. 3 in the unloaded state without the upper part of the support frame and the returning cover belt.

Each of these pressure rollers 11 (a and b) is connected to the frame by a lever 13 in an articulated manner (see FIGS. 4 and 5). A bracket or clamp bracket 15, which is articulated to the lever 13, on the one hand, and is rigidly connected to the two ends of the axis of the pressure roller 11, on the other hand, is located between the lever 13 and the pressure roller 11 to define a joint. The pivot axis 14 of this joint is arranged between the bracket 15 and the lever 13 such that the pressure roller 11 can always adapt itself automatically to the trough of the material being conveyed and the basic belt at different degrees of filling of the cover belt conveyor. In contrast, the pivot axis 16 of the lever 13 in relation to the frame 8 extends in parallel to the axis of the pressure roller 11. The pivot axes 14 and 16 thus form together a universal joint at the two ends of the lever 13.

Suitable spring elements are provided to generate the necessary pressing force. These may be either spring bars 17 arranged in an articulated manner between the frame and the roller-side end of the lever 13 according to FIG. 2a or torsion springs 18 arranged in the joint between the lever 13 and the frame according to FIG. 2b.

The pressure rollers 11 for the cover belt 3 are always arranged between the support rollers 9 of the basic belt 2 in the conveying direction. A favorable distribution of the pressing forces is obtained due to this offset arrangement because of the elastic properties of the basic and cover belts 2 and 3. Relative to the width of the basic and cover belts 2 and 3, the pressure rollers 11 are arranged in four different positions: In the two outer positions opposite the two bevels of the basic belt 2 and the two positions located in the middle, straight area of the basic belt 2 to the right and left of the center line of the basic belt 2. An inner pair of pressure rollers 11a and an outer pair of pressure rollers 11b are always arranged alternatingly. As a result, the pressing forces are also extended to the adjacent areas as a consequence of the bending strength of the cover belt 3.

Due to the pressure rollers 11a and 11b being composed of rubber disks and due to the outer edges of the rollers being rounded off; extremely strong forces, which could lead to excessive wear of the cover belt 3, will not act in the case of extreme lateral height differences.

Due to the arrangement of four pressure rollers 11(a and b) distributed over the entire width of the belt, these rollers can readily adapt themselves to unevennesses of the surface of the material being conveyed.

Since each pressure roller 11a and 11b is arranged separately on a lever 13, there is no dependence on the adjacent pressure roller 11. There is no lateral squeezing between the pressure rollers 11a and 11b and the cover belt 3 in the different states of filling of the conveyor when the amount of material being conveyed increases or decreases, because the pressure rollers 11a and 11b almost always act on the same line of the cover belt 3, which line extends in the direction of conveying.

Figure 3:
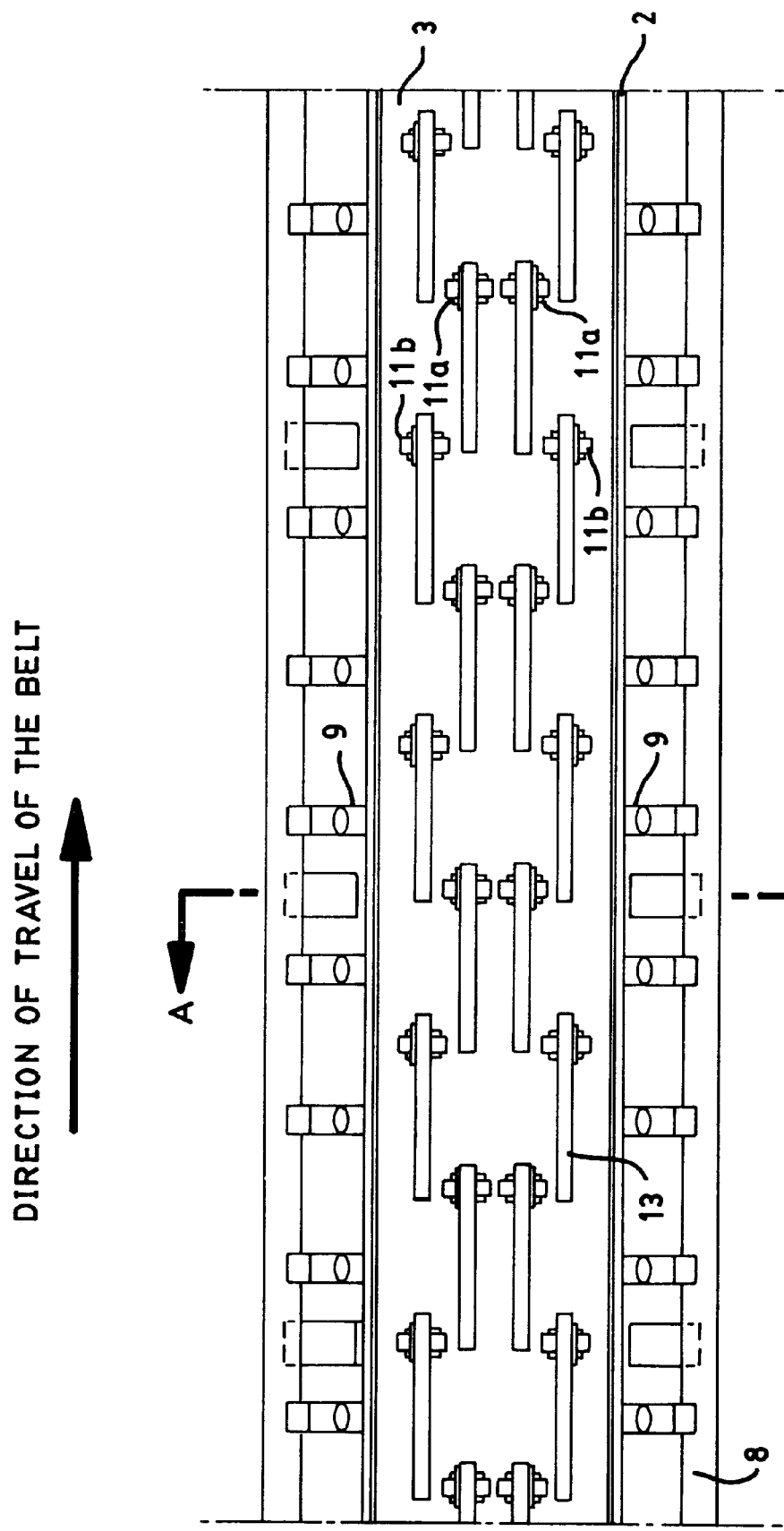
FIG. 3 is a top view of the cover belt conveyor in the design according to FIG. 2a without the upper part of the support frame and the returning cover belt.

Due to the inner and outer pressure rollers 11b being arranged alternatingly, mutual hindering is ruled out even in the case of the maximum oblique position of the pressure rollers 11a and 11b, which is present in the case of the empty conveyor in the area of the clamps 15, as is shown in FIG. 3.

To compensate extreme unevennesses extending over the conveying cross section on the surface of the material being conveyed, a rake may be arranged in the area between the material-loading area and the steep conveying.

While specific embodiments of the invention have been shown and described in detail to illustrate the application of the principles of the invention, it will be understood that the invention may be embodied otherwise without departing from such principles.

What is claimed is:

1. A cover belt conveyor for conveying bulk material, the conveyor comprising:
    a trough shaped basic belt having two bevel portions and a straight, nontroughed area;
    a cover belt;
    a drive connection with which either both said basic belt and said cover belt are driven or only said basic belt is driven and said cover belt is carried by a fictional connection with said basic belt;
    a frame;
    basic belt support rollers providing said basic belt with a trough shaped support;
    two inner pressure rollers arranged in the area of a sloping or vertical conveying section;
    two outer pressure rollers arranged in the area of a sloping or vertical conveying section said two inner pressure rollers and said two outer pressure rollers are always arranged alternatingly one after the other in a direction of conveying individually connected to said frame, pivotably with respect to said lever, wherein said two outer pressure rollers are always arranged connected to said frame individually above said two bevel portions in a direction of pressing, relative to a cross-sectional area of the flow of material being conveyed, and said two inner pressure rollers are always arranged above said straight nontroughed area of said basic belt in the pressing direction;
    levers, each pressure roller being connected to said frame by a corresponding one of said pivot axis connections and a corresponding one of said levers;
    springs, each of said levers being directed in the direction of conveying in one plane and obliquely against said cover belt by a corresponding one of said springs in another plane and a pressing force of the springs for said middle pressure rollers (11a) is selected to be stronger because of the larger amount of material being conveyed there than the pressing force of the springs of said two outer pressure rollers;
    clamps, each of said clamps having two clamp sides for receiving a corresponding one of said pressure rollers for rotating about a clamp axis, each of said clamps being connected to a corresponding one of said levers by a corresponding one of said pivot axis joint connection, through which said pressure roller with its axis of rotation adapts itself automatically to the surface of the bulk material and said pressure rollers are always arranged between an outer extent of said support rollers in the direction of conveying, so that the material being conveyed is carried in all sections of the conveying path.

2. A cover belt conveyor in accordance with claim 1, wherein said spring for applying pressure via said pressure roller is a torsion spring connected to said frame at a pivot axis of said lever.

3. A cover belt conveyor in accordance with claim 1, wherein said spring for applying pressure via said pressure roller is a spring bar arranged between said frame and a pressure roller-side end of said lever.

4. A cover belt conveyor in accordance with claim 1, said springs has a torque characteristics selected to be such that the spring forces will increase with increasing filling cross section.

5. A cover belt conveyor in accordance with claim 1, wherein said pressure rollers consist of rubber disks.

6. A cover belt conveyor in accordance with claim 1, outer edges of said pressure rollers are rounded off.

7. A cover belt conveyor in accordance with claim 1, further comprising: a chute defined by said basic belt; and said cover belt and a rake, which distributes extreme elevations of the bulk material, arranged in the direction of conveying between said chute and a range of action of said cover belt.

8. A cover belt conveyor for conveying bulk material, the conveyor comprising:
    a trough shaped basic belt having two bevel portions and a central straight, non-trough shaped area;
    a cover belt;
    a drive connection with which either both said basic belt and said cover belt are driven or only said basic belt is driven and said cover belt is carried by a frictional connection with said basic belt;
    a frame;
    basic belt support rollers providing said basic belt with a trough shaped support;
    levers pivotably connected to said frame;
    brackets, each of said brackets being connected to a corresponding one of said levers by a corresponding pivot axis joint connection;
    springs, each of said levers extending in a direction of conveying and obliquely biased against said cover belt by a corresponding one of said springs;
    two inner pressure rollers, arranged in the area of a sloping or vertical conveying section;
    two outer pressure rollers arranged in the area of a sloping or vertical conveying section said two inner pressure rollers and said two outer pressure rollers being arranged alternatingly in the direction of conveying, each of said inner pressure rollers and said two outer pressure rollers being individually connected to said frame via a corresponding one of said brackets for rotating about a bracket axis, said brackets each being pivotable with respect to the corresponding lever about a corresponding bracket pivot axis whereby the corresponding pressure roller adapts itself automatically to the surface of the bulk material, said pressure rollers being arranged between an outer extent of said support rollers in the direction of conveying, wherein said two outer pressure rollers are arranged above said two bevel portions in a direction of pressing, relative to a cross-sectional area of the flow of material being conveyed, and said two inner pressure rollers are arranged above said straight non trough shaped area of said basic belt in the pressing direction, a pressing force of said springs for inner pressure rollers being stronger than a pressing force of the springs of said two outer pressure rollers.

9. A cover belt conveyor in accordance with claim 8, wherein said springs for applying pressure via said pressure roller are torsion springs connected to said frame at a pivot axis of said lever.

10. A cover belt conveyor in accordance with claim 8, wherein said springs for applying pressure via said pressure roller are spring bars arranged between said frame and a pressure roller-side end of a corresponding lever.

11. A cover belt conveyor in accordance with claim 8, said springs have torque characteristics selected to be such that the spring forces will increase with increasing filling cross section between said cover belt and said basic belt.

12. A cover belt conveyor in accordance with claim 8, wherein said pressure rollers consist of rubber disks.

13. A cover belt conveyor in accordance with claim 8, outer edges of said pressure rollers are rounded off.

14. A cover belt conveyor in accordance with claim 8, further comprising: a chute defined by said basic belt; and said cover belt and a rake, which distributes extreme elevations of the bulk material, arranged in the direction of conveying between said chute and a range of action of said cover belt.

* * * * *